(12) United States Patent
Gavrila

(10) Patent No.: US 6,556,692 B1
(45) Date of Patent: Apr. 29, 2003

(54) IMAGE-PROCESSING METHOD AND APPARATUS FOR RECOGNIZING OBJECTS IN TRAFFIC

(75) Inventor: Dariu Gavrila, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/351,904

(22) Filed: Jul. 14, 1999

(30) Foreign Application Priority Data

Jul. 14, 1998 (DE) .......................................... 198 31 413

(51) Int. Cl.[7] .................................................. G06K 9/00
(52) U.S. Cl. ........................ 382/104; 382/209; 382/218; 382/227; 382/278; 382/302
(58) Field of Search ................................ 382/103, 104, 382/209, 278, 190, 218, 227, 302

(56) References Cited

U.S. PATENT DOCUMENTS

| | | | |
|---|---|---|---|
| 5,123,057 A | | 6/1992 | Verly et al. |
| 5,619,596 A | * | 4/1997 | Iwaki et al. ................. 382/278 |
| 6,181,805 B1 | * | 1/2001 | Koike et al. ................. 382/118 |
| 6,307,964 B1 | * | 10/2001 | Lin et al. ..................... 382/203 |

OTHER PUBLICATIONS

Gälich, R.–E; Ritter, W. "Aknowledge based system for traffic sign recognition," *Mustererkennung* [*Pattern Recognition*][2] 1990, 12th DAGM Symposium, Oberkochen, Sep. 24–26, 1990, Springer Publishing House, pp. 82–89.

K.–D. Kuhnert, A. Zapp: "Wissensgesteuerte Bildfolgeauswertung Zur Automatischen Führung Von Strassenfahrzeugen in Echtzeit" [Knowledge–Controlled Picture Sequence Evaluation for the Automatic Guidance in Real Time of Vehicles on the Road], *Mustererkennung* [Pattern Recognition ]1985, 7th DAGM Symposium, Erlangen, Springer Publishing House, pp. 102–106.

U. Büker, H. Austermeier, G. Hartmann, B. Mertsching "Verkehrszeichenanalyse in Hierarchisch Codierten Bildern" [Traffic Sign Analysis in Hierarchically Coded Images], *Mustererkennung* [Pattern Recognition ]1993, 15th DAGM Symposium, Lübeck, Springer Publishing House, pp. 694–701.

D.P. Huttenlocher, G. A. Klanderman, W. J. Rucklidge "Comparing Images Using the Hausdorff Distance" [IEEE Transactions on Pattern Analysis and Machine Intelligence ]vol. 15, No. 9, Sep. 1993, pp. 850–862.

P. Seutens, P. Fau, A. J. Hanson "Computational Strategies for Object Recognition" ACM Computing Surveys, vol. 24, No. 1, Mar. 1992, pp. 31 and 59.

B. Radig, "Mustererkennung" 1991, 13th DAGM Symposium, Mücchen, 9–11. Oct. 1991, pp. 287–294.

* cited by examiner

*Primary Examiner*—Bhavesh Mehta
*Assistant Examiner*—Gregory Desire
(74) *Attorney, Agent, or Firm*—Davidson, Davidson & Kappel, LLC

(57) ABSTRACT

An image-processing method, and an apparatus for carrying out the method, that is used particularly for detecting and recognizing objects in traffic. Locally-softened feature images of an image scene are correlated with feature images of patterns for detecting and recognizing objects in real scenes with the use of images. A plurality of patterns ordered in a pattern tree structure is correlated with the image scene. To extensively prevent erroneous detections, the features are subdivided into different feature types.

11 Claims, 6 Drawing Sheets

(a) (b)

(c) (d)

C(R):

Tu(R):

Td(R):

IMAGE-PROCESSING METHOD AND APPARATUS FOR RECOGNIZING OBJECTS IN TRAFFIC

CROSS-REFERENCE TO RELATED APPLICATIONS

Priority is claimed with respect to German application No. 198 31 413.2 filed in Germany on Jul. 14, 1998, the disclosure of which is incorporated herein by reference.

BACKGROUND OF THE INVENTION

The invention relates to an image-processing method, and an apparatus for carrying out the method, in which one or a plurality of feature image patterns is correlated with an original image, with a feature image scene being formed from an original image scene through feature extraction, the feature values of the scene being locally softened through a transformation or a filter, and the transformed image scene being correlated with the feature image patterns, and/or the feature values of the feature image patterns being softened through a transformation or a filter, and the transformed feature image patterns being correlated with the feature image scene, and with objects being detected and recognized with the processed image data.

The use of the invention is not limited to the recognition of objects in traffic, but can be used in any type of image-monitoring systems and in image databases.

A publication by W. J. Rucklige in the Int. J. of Computer Vision 24(3), pp. 251–270 (1997) discloses a method of correlating a predetermined pattern with an image to be evaluated using a distance transformation; in this method, a pattern is first subjected to an affine transformation with coefficients to be determined, and correlated afterward with the image.

In the IEEE Trans. on Pattern Analysis and Machine Intelligence, 10(6), pp. 849–865 (1988), G. Borgefors describes an image-recognition method based on distance transformations, which method is expanded by the use of an image-resolution pyramid.

In "Hybrid approach for traffic sign recognition" by Janssen et al. in the Proc. of Intelligent Vehicle Conference, pp. 390–395 (1993), a method is described that employs adjacent color fields to detect regions in the image that may include traffic signs. The quantity of regions to be analyzed is further limited by the evaluation of heuristics based on format attributes of the regions (e.g. surface, eccentricity) and proximity conditions. The image regions that remain as possible traffic signs are cut out of the original image and classified.

A method of recognizing traffic signs is disclosed in G. Piccioli et al., "Image and Computing," No. 14, pp. 209–223 (1996). In a color-based setup for recognizing traffic signs, different recognition possibilities are disclosed, with which possible traffic sign shapes (circles, triangles) are evaluated. First, the contour segments are detected; then, it is checked whether these can be combined to yield the desired shape.

"Fast Object Recognition in Noisy Images Using Simulated Annealing" by M. Betke et al. in Proc. of IEEE Int. Conf. on Computer Vision, pp. 523–530 (1995) describes a pictogram-based method of recognizing traffic signs, in which different patterns are correlated with an image. The patterns contain the pictogram information of searched traffic signs.

The patent publication DE 36 19 824 C2 by E. D. Dickmanns describes an apparatus for indicating the maximum speed for road vehicles that is presently dictated or safe, depending on the environmental conditions. A pivotable camera whose images are evaluated is employed to detect and recognize traffic signs with the aid of an information and evaluation device. The result of the recognition is combined with other sensor information in a matching circuit, then displayed for the driver.

SUMMARY OF THE INVENTION

It is an object of the invention to optimize the capability of object detection in images based on known methods.

The above and other objects are accomplished in the context of the image processing method first mentioned above, wherein during the correlation of the transformed image scenes with the feature image patterns, knowledge is applied that is based on the knowledge about the objects to be detected, and/or on global knowledge about the situation in the scenario associated with the original image, and, based on this knowledge, only specific regions of the feature image scene and/or only specific feature image patterns are correlated with one another.

An advantage of the invention is that, through the correlation of the feature images of an image scene with feature images of patterns (or vice versa), the feature images having been locally softened through transformation, it becomes possible to detect and/or recognize objects in natural scenes with the use of images. The objects can be partially covered and appear in numerous forms in the image (e.g. appear different due to various light conditions and different shapes, textures, positions, orientations and movements of the object). This is the case, for example, for objects occurring in traffic, such as pedestrians, vehicles, traffic signs and the like.

The feature image patterns of the objects to be detected and recognized are determined analytically through the sampling of examples, or a priori knowledge about the objects.

In the invention, the special correlation performed in the image cutout, which involves the feature images of an image scene that have been locally softened due to the transformation and the feature images of patterns (or vice versa), effects a successful detection and recognition of objects, even if data are absent or do not correspond to a so-called prototype. The method of locally softening the features, which is used in the procedure prior to the correlation, permits necessary tolerances between the pattern and the form in which the object appears.

Another advantage of the method of the invention is that N pattern images representing one or more objects to be detected are correlated in an image scene through the creation of a pattern tree structure (pattern hierarchy). The method is thus more efficient than methods in which N respective patterns are correlated separately.

Independently of the use of a pattern tree structure, the method of the invention has the advantage that a plurality of feature types, such as edge orientations, can be taken into consideration simultaneously in the correlation. The use of M different feature types reduces the probability of an erroneous pattern allocation in the image. The correlation is performed with corresponding features.

A further advantage of the invention is that the detection results are evaluated with known classification methods of pattern recognition, and an object recognition is thus performed.

Because the method is not necessarily based on the evaluation of color information, an apparatus having a monochromatic camera can advantageously be used; in this instance, the outlay for the data conversion is low, making the apparatus inexpensive.

BRIEF DESCRIPTION OF THE DRAWINGS

The invention is described in detail below by way of embodiments, with referent to a schematic drawing.

FIG. 2a shows an image scene; FIG. 2b shows a corresponding pattern; FIG. 2c shows the edge image of the scene; and FIG. 2d shows the edge image of the scene that is generated with the distance transformation.

DETAILED DESCRIPTION OF THE INVENTION

Figure 1:
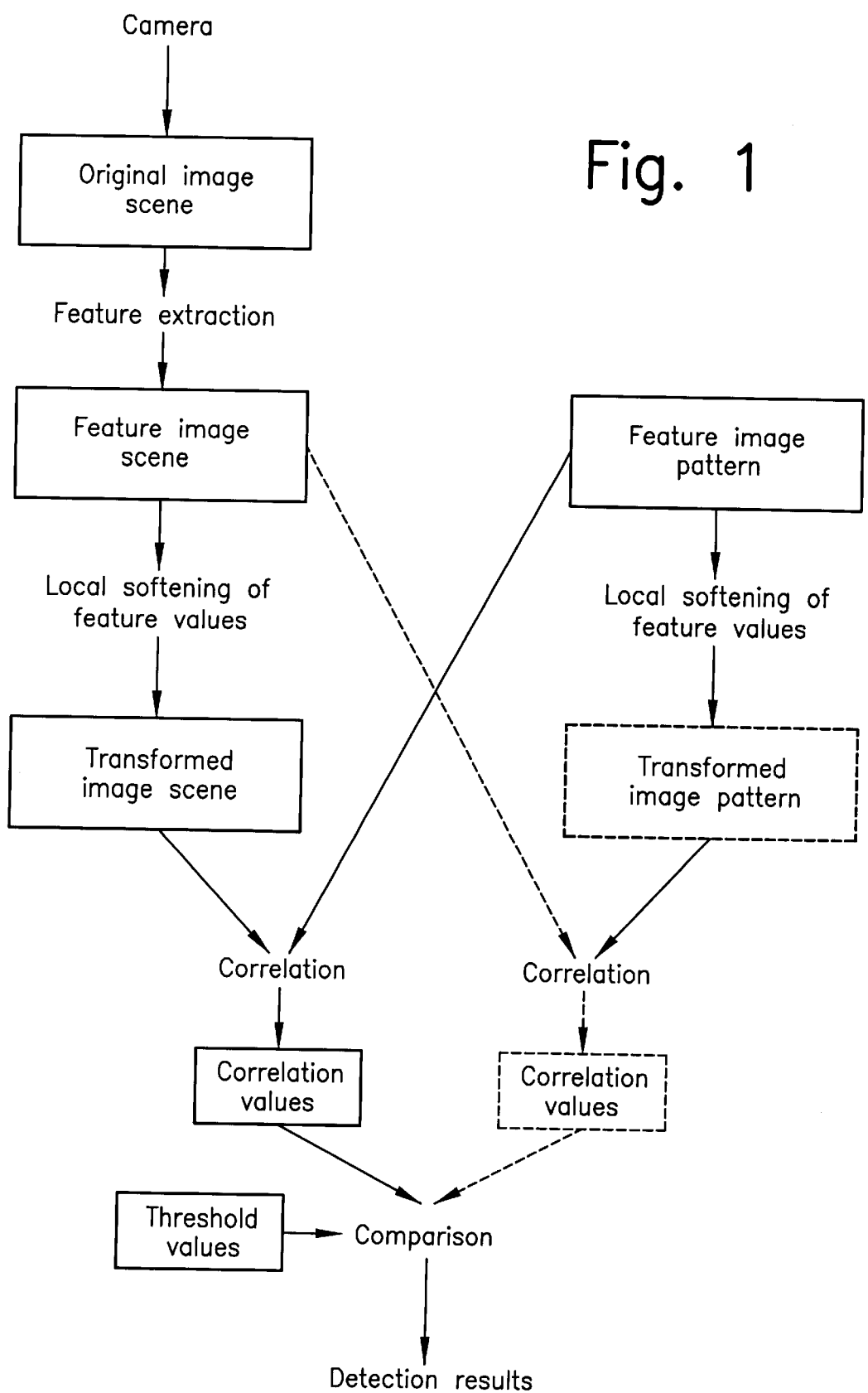
FIG. 1 shows a flow chart for an image-processing method based on the correlation of locally-softened feature images.

In the image-processing method according to FIG. 1, a feature extraction is applied to the original image scene recorded by a camera. A feature image scene is formed, in which each pixel value is a measure for the presence or expression of a particular feature at the pixel position (feature value). This feature image scene is correlated with a corresponding feature image pattern. For this purpose, the feature image of the scene is first transformed such that the feature values are softened. The softening is effected with a filter or a transformation, with the feature values being softened locally, i.e., the values either increase monotonously or fall with an increasing image distance. The softening is attained, for example, through a distance transformation or an arbitrary low-pass filter. The result is a transformed image scene.

The feature image pattern is correlated with the transformed image scene at certain image positions. The generated correlation values constitute a measure for the matching of the patterns to the image scene at the respective image positions. To decide whether the object can be classified as detected, a threshold-value comparison can then be performed (solid line in FIG. 1). The results of the detection respectively include the image position in which a certain pattern is successfully correlated.

The feature image pattern and feature image scene can also be correlated such that the feature image pattern is first softened (transformed image pattern) and subsequently correlated with the feature image scene (dashed lines in FIG. 1). It is also possible to correlate the transformed image scene with the transformed image pattern.

In the correlation of image patterns and image scenes, feature vectors are formed from the respective pixel values according to known methods, and the scalar product of the feature vectors is formed. Correlation variations with a so-called robust normalization (e.g. with the Hausdorff distance or chamfer distance transformation) can also be used.

The feature extraction described above can be performed with arbitrary features that are associated by pixel with an image scene.

Edge features that are extracted with a so-called Sobel filter are used frequently.

Figure 2:
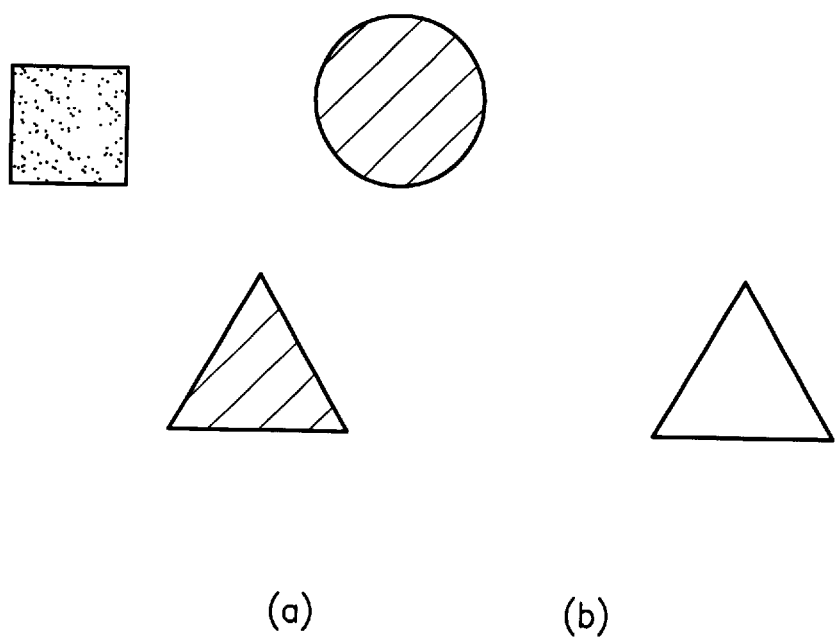
FIG. 2 shows an application of the image-processing method with edge features.
Figure 2:
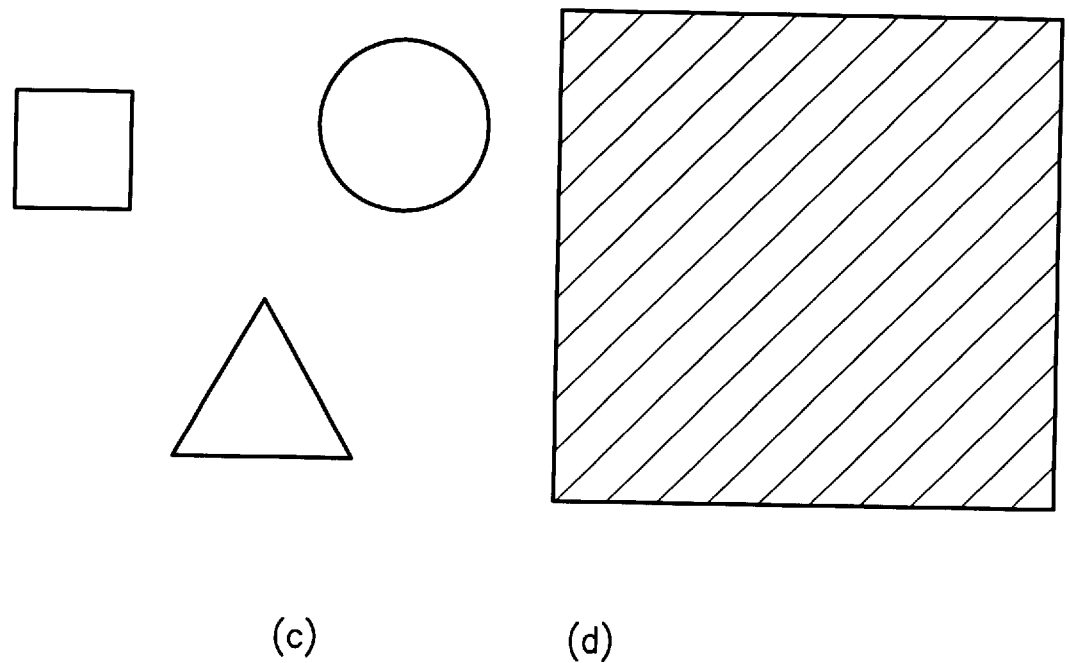

FIG. 2 shows examples for recognizing features. The task lies in, for example, detecting the triangle from the original image scene in FIG. 2a using its shape (edge). The corresponding edge pattern (triangle) is illustrated in FIG. 2b. A binary edge extraction of the image scene yields the edge image scene in FIG. 2c. The edge image of the scene is locally softened with a distance transformation; a data pixel is either allocated or not. The result of the distance transformation is a non-binary image (transformed image scene) in which each pixel value represents the spacing from the next data pixel in the non-transformed image (FIG. 2d) in the sense of a spacing standard. Small spacing values are represented by a dark shade of gray in FIG. 2d.

The present invention expands the method of FIG. 1 in that a plurality of object classes is defined and recognized. The object classes are represented by N patterns, with the N patterns being ordered in a tree structure (pattern hierarchy).

The pattern tree structure has various levels, with the lowest comprising N nodes containing the respective patterns to be recognized. The higher levels comprise nodes that represent the so-called prototype patterns. The prototype patterns represent lower-level pattern groups. The nodes associated with a specific node X are characterized as "children" of the node X.

In the method of the invention, the image scene is no longer correlated separately with the N patterns, but the pattern tree structure is correlated with the image scene. In this procedure, the tree structure is processed with a predetermined strategy (for example, depth-first or breadth-first). As each node is processed, the associated prototype pattern is correlated with the image scene. A certain cutout from the image is evaluated with a node-dependent detection threshold value. The result of the correlation is pixel coordinates that are a function of whether the prototype pattern was successfully correlated with the image scene, taking into consideration the detection threshold value. The children of the lower-level prototype pattern are subsequently correlated in the image region, or in its immediate vicinity. An advantage of this hierarchical evaluation method is that similar patterns are ordered into the same group in each level with the use of a cluster method, thus forming a prototype. The prototype is the representative pattern for the respective group. Because the correlation is performed with prototype patterns, and not each individual pattern of the group, the method is reliable and fast.

The pattern tree structure is preferably combined with a coarse-to-fine pixel grid. The prototype patterns in the higher levels of the tree structure represent highly-generalized, fuzzy patterns that are correlated with the image scene in a coarse pixel grid. The detection threshold values are set with few restrictions. In the lower levels of the tree structure, the patterns become increasingly specific. These patterns are preferably correlated with the image scene with a finer pixel grid and with restrictive detection threshold values.

One embodiment explains the detection of traffic sign shapes with the pattern tree structure. Edge features of the patterns for circles C (R) and triangles with a corner at the top Tu(R) and a corner at the bottom Td(R) are used, with a radius R on the order of magnitude of 7–18 pixels. The size of the original image is 360 times 288 pixels.

Figure 3:
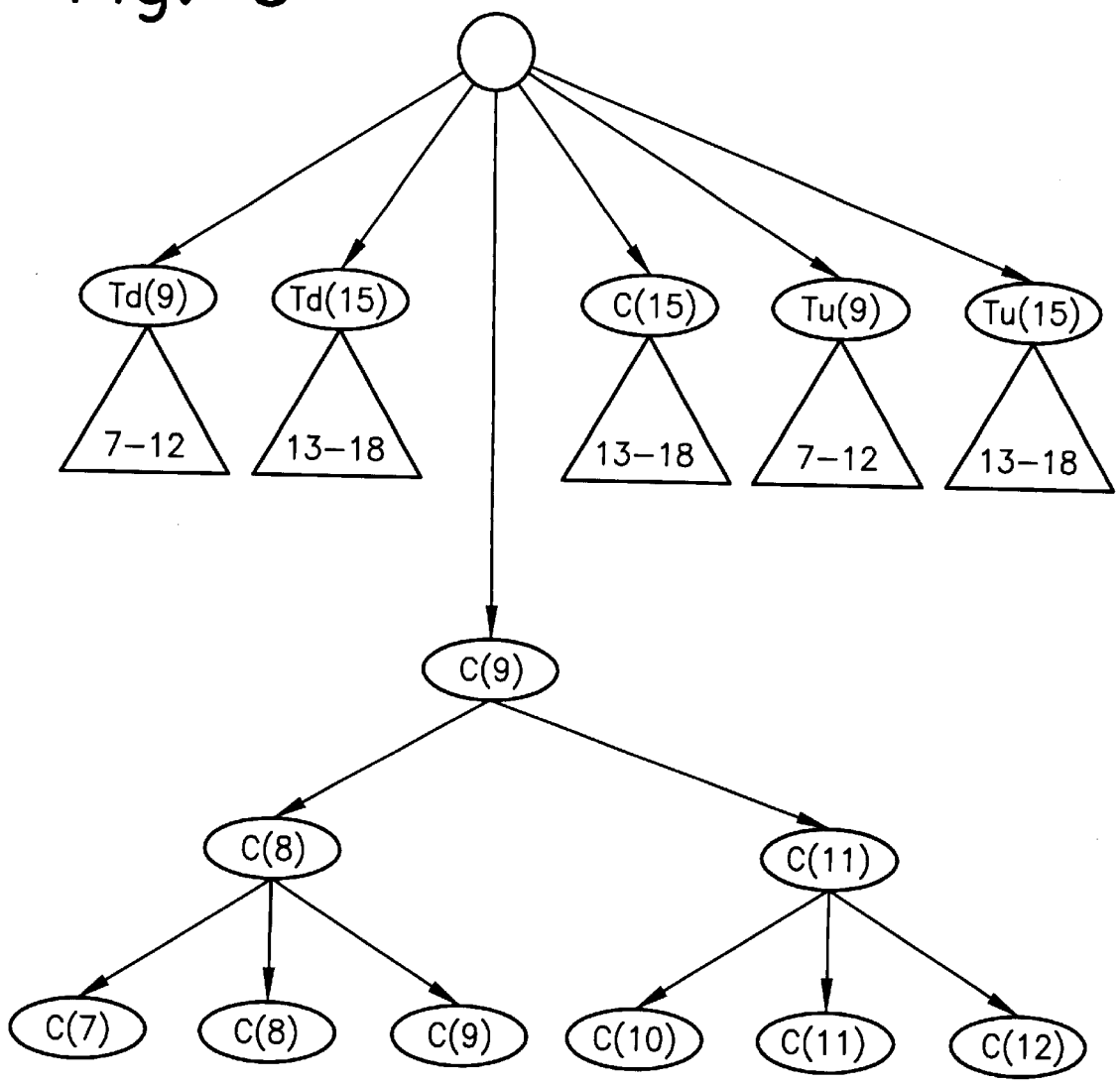
FIG. 3 shows a pattern tree structure for different object shapes (triangles, circles) and object sizes.
Figure 3:
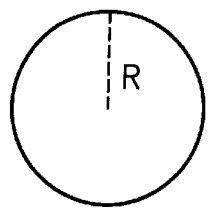
Figure 3:
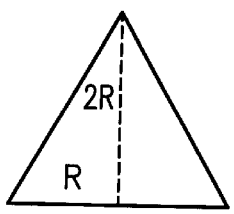
Figure 3:
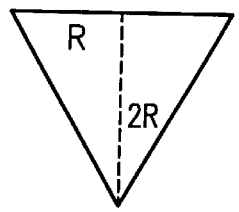

Altogether, 36 patterns are formed, for which a tree structure is constructed according to FIG. 3. The tree structure has three levels. The prototype patterns in Level 1 are the patterns having the radii R, which correspond to the average value of the intervals [7, 12] and [13, 18], namely 9 and 15. The prototype patterns of Level 2 are the patterns having the radii that correspond to the average value of the intervals [7, 9], [10, 12], [13, 15] and [16, 18], namely 8, 11, 14 and 17. Thirty-six patterns are illustrated in Level 3, the lowest level.

To correlate this pattern tree structure with the image scene, first an edge extraction is performed in the original image scene, and the binary feature image scene is locally softened with the distance transformation, analogously to the method according to FIG. 1. The transformed image scene is correlated with the nodes of the pattern tree structure. The nodes of the pattern tree structure are run through as follows: First, the nodes in Level 1, then the nodes in Level 2, etc. In the coarse-to-fine sampling of a pattern, a grid size r of, for example, r=8, 4, 1 pixels is assumed for the three levels of the pattern tree.

A further improvement to the method of the invention lies in the differentiation between M different feature types. Typical feature images are generated for the image scene and the N patterns. A total of (N+1)M feature images is formed, and ordered according to type. The local softening of the feature images and the subsequent correlation are effected for each of the M feature types. The individual correlation results are then added.

The simultaneous use of M feature types reduces erroneous pattern associations in the image, because not only the spatial distribution of features in the pattern and image scene, but also the matching of the feature types, is observed during the correlation.

Figure 4A:
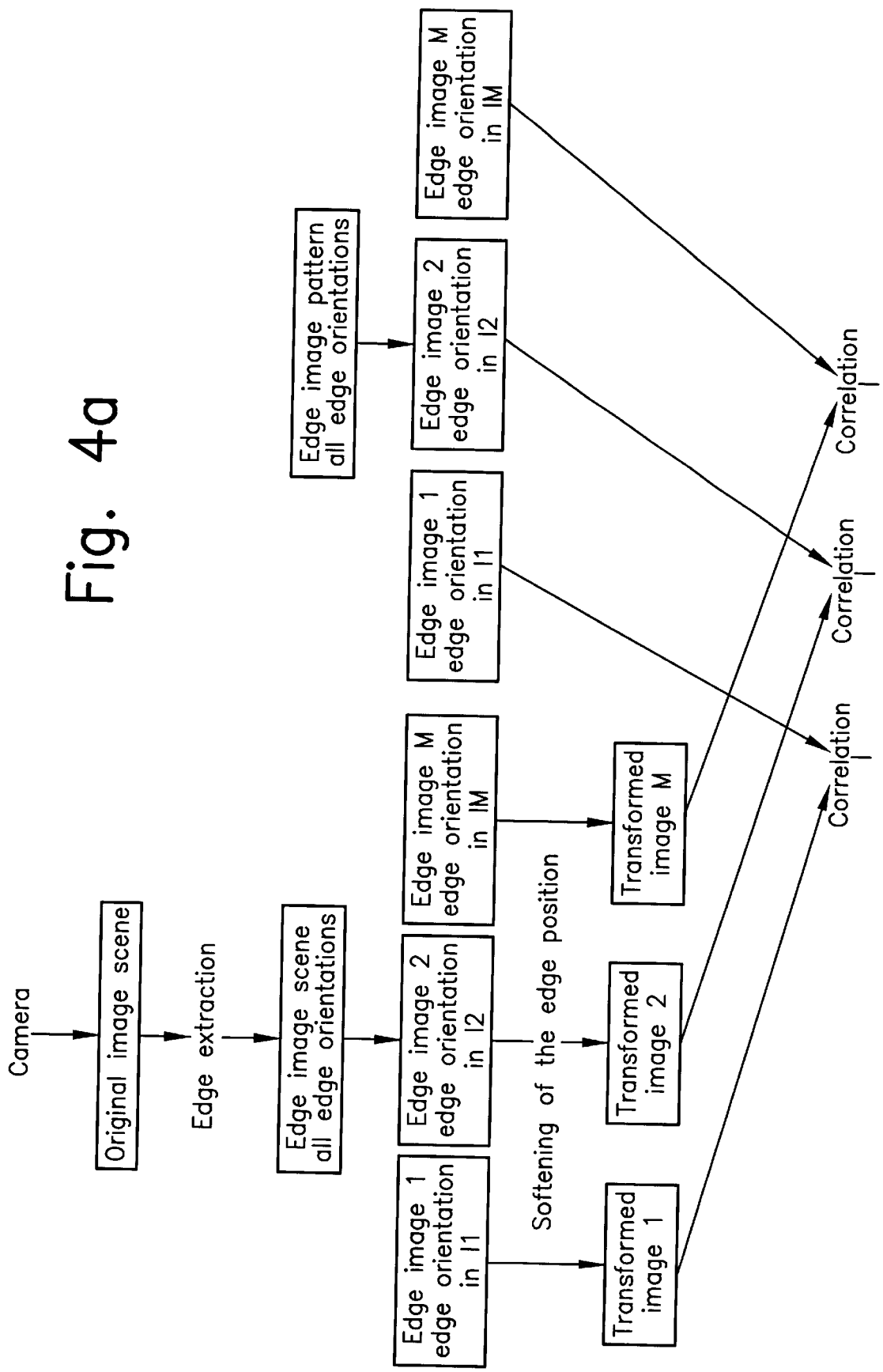
FIGS. 4a and 4b show a flow chart for an image-processing method for object detection, which is based on the correlation of the softened edge orientations, the lines at the bottom of FIG. 4a connecting with the lines at the top of FIG. 4b.
Figure 4B:
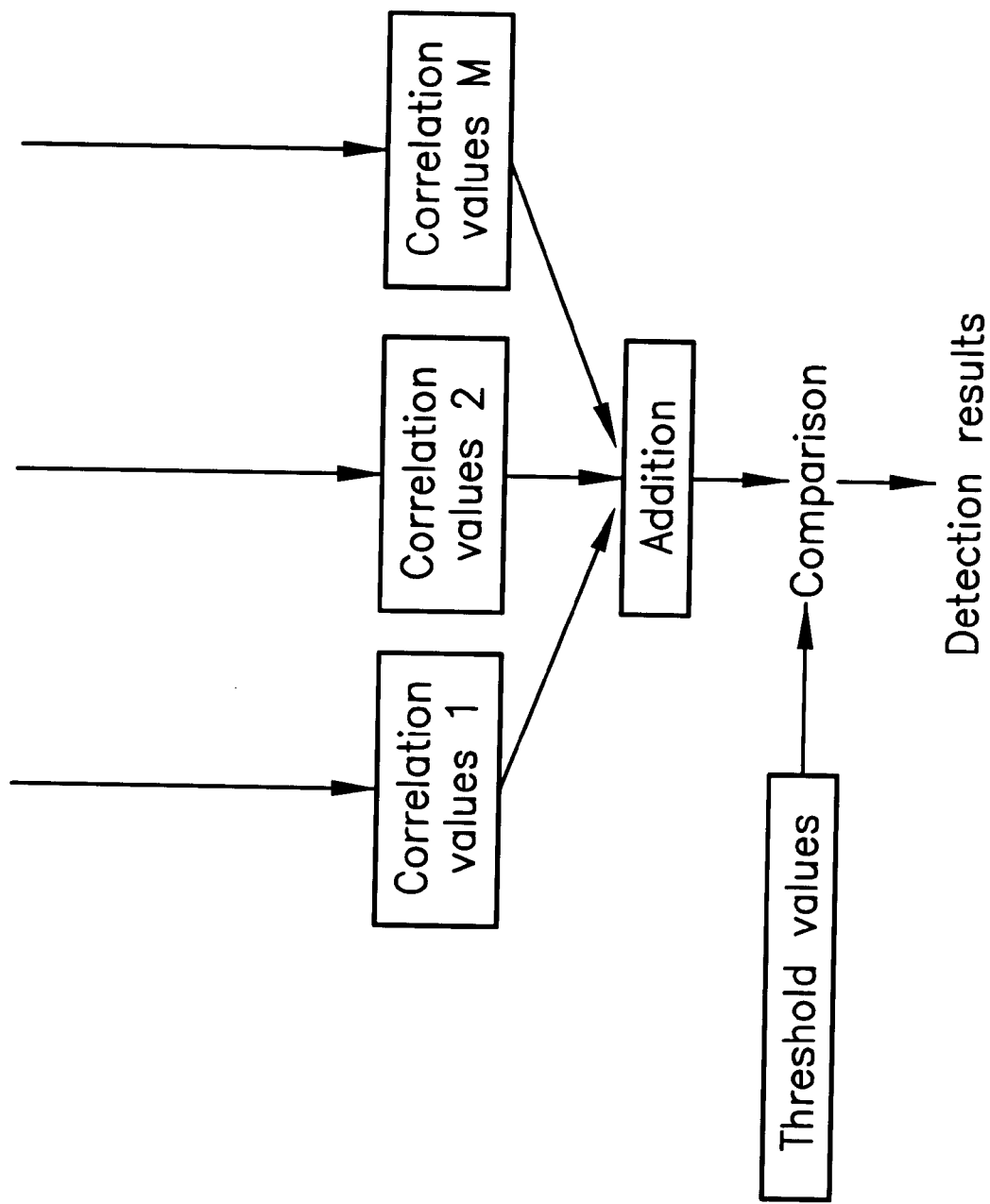

A further embodiment according to FIGS. 4a and 4b explains the use of different feature types. The edges used as features are subdivided into edge orientations. An edge orientation of the scene and an edge image of the pattern are subdivided into M edge images, depending on edge orientation, in I1 to IM intervals, for example, for the possible orientations on the unit circle. The M edge images of the image scene are then locally softened with a distance transformation. The correlation of the M edge image patterns with the M transformed edge images of the scene is then performed for identical intervals, as illustrated in FIG. 4.

M individual correlations, which vary according to feature type, are performed through a combination of the pattern tree structure with the differentiation according to feature types of the image scene and pattern, instead of a correlation with a node in the tree structure. The M correlation results are then added.

Figure 5:
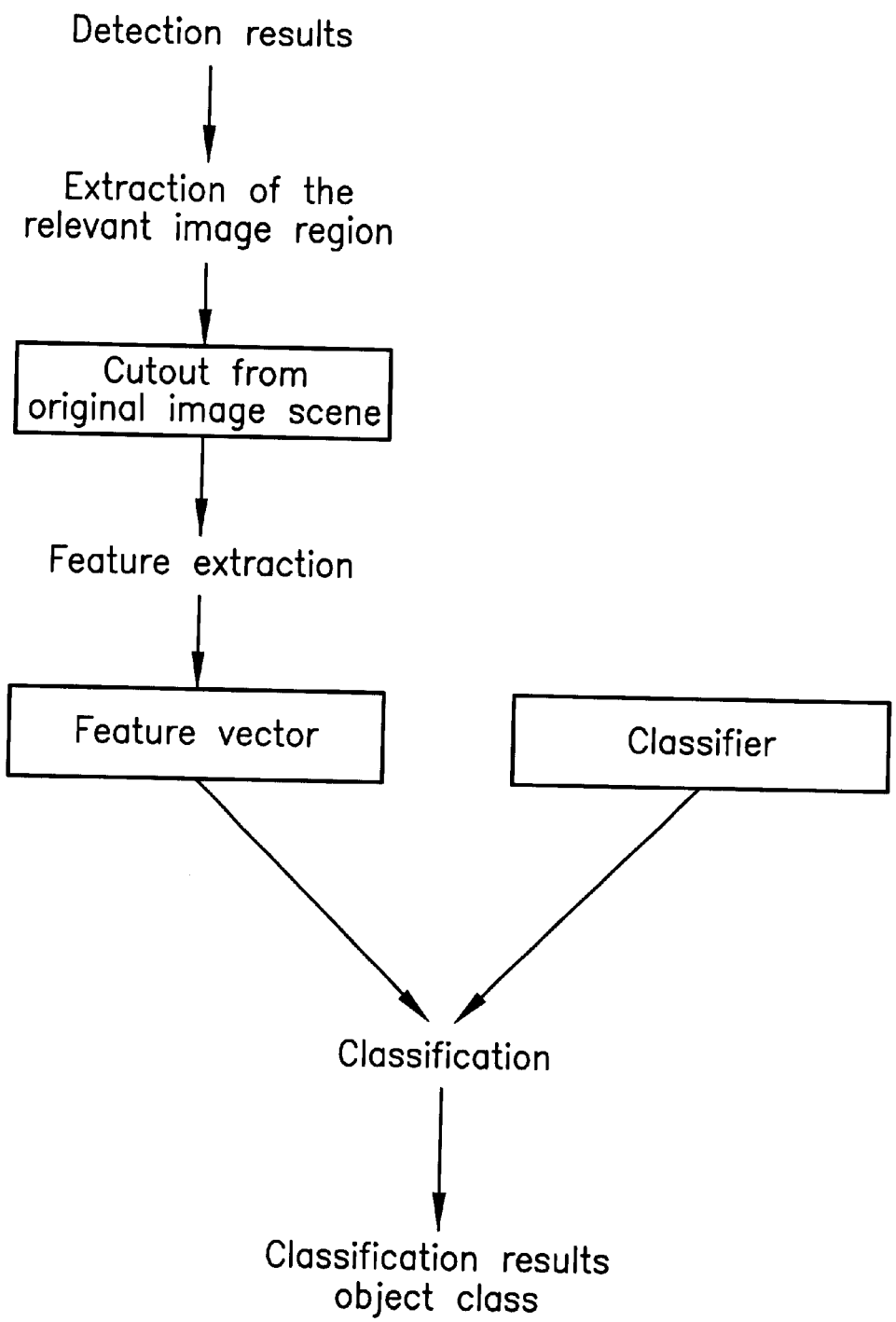
FIG. 5 is a flow chart showing the results from the object-detection method by means of object classification for object recognition.

The detection results from the image-processing method of the invention can subsequently be allocated to a specific object class and checked with known classification methods. According to FIG. 5, an image cutout for which the correlation was performed successfully is selected from the original image. In this image cutout, arbitrary features are extracted and a feature vector is determined. The feature vector is allocated to a specific object class with known classification methods. For example, classification methods are used that were adapted to a characterized sample in a learning phase. Examples of possible classifiers include polynomial classifiers, normal distribution classifiers and neuronal networks.

The method of the invention can also be used for the case in which the patterns are not searched in the entire image, but only in image cutouts. This type of reduction of the search region results when, for example, an object is followed with the assumption that its movement is continuous. Other assumptions that permit a reduction of the search region are, for example, global knowledge about the position of objects, or information from other sensors (such as GPS), or map information or information from previous image-processing methods.

The recognition results from the present image-processing method can be improved through the evaluation of sequences of images, with the results being integrated over time.

The image-processing method of the invention is advantageously used for recognizing objects in traffic. The objects are traffic infrastructure devices, such as traffic signs, roadsides, road markings or users of the road (vehicles, pedestrians, cyclists, etc.).

The image-processing method can be used for road traffic, as well as for rail or air traffic.

An apparatus for recognizing traffic objects, which is used, for example, in a motor vehicle, can comprise an image-sensor unit, an information-processing unit, a memory and a display unit. The mobile image-sensor unit, comprising, for example, one or a plurality of cameras, partially or completely records the surroundings of the traffic with image data. The information-processing unit uses these image data, employing the described image-processing method, to detect and recognize objects in the traffic surroundings. The memory unit stores the image data, and the display unit presents the detected and recognized objects to the driver, for example visually via a display, or acoustically.

The detection of relevant objects in traffic, such as a no-entry sign or road users located directly in front of the vehicle, is intended to elicit the safe driving behavior required for traffic situations. The data collected with the image-processing method can also be further processed for regulating vehicle driving behavior. A regulating unit in the vehicle can regulate, for example, the transverse and longitudinal behavior and the speed.

Furthermore, the data collected with the image-processing method can be stored in a database for later access.

A further use for the image-processing method is found in traffic monitoring. An image-sensor unit, such as one or more stationary cameras, partially or completely records the traffic surroundings. An information unit detects and recognizes the image data with the method of the invention, and evaluates the results, for example, the traffic flow, categorizing them according to different road users. A memory unit stores the image data and the results of the evaluation. A display unit shows the recognized objects and the evaluation results.

The object positions determined by the recognition results can be transformed into 2D or 3D global coordinates. The transformation is effected with the assumption that the cameras are calibrated. It is further assumed that the bottom of the image scene is level.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An image-processing method for correlating one or a plurality of feature image patterns with an original image, a feature image scene being formed from an original image scene through feature extraction, feature values of the feature image scene being locally softened through a transformation or a filter to define a transformed image scene, and the transformed image scene being correlated with the feature image patterns, and/or the feature values of the feature image patterns being softened through a transformation or a filter to define transformed feature image patterns, the transformed feature image patterns being correlated with the feature image scene, and with objects being detected and recognized with the processed image data and as a function of knowledge about the objects to be detected and/or on global knowledge about the situation in the scenario associated with the original image, the method comprising the steps of:

correlating N feature image patterns with the feature image scene through creation of a pattern hierarchy having a plurality of levels, the pattern hierarchy including prototype patterns that are formed from a group of feature image patterns from a hierarchically subordinate level; and correlating the image scene with further prototype patterns from the hierarchically subordinate level in image regions in which a prototype pattern is successfully correlated with the feature image scene.

2. The image-processing method as recited in claim 1, wherein the N feature image patterns of the objects to be detected and recognized are analytically generated with the use of samples or a priori knowledge about the objects.

3. The image-processing method as recited in claim 1, wherein the correlation of the feature image scene using the pattern hierarchy is combined with a coarse-to-fine pixel grid sampling that is either as fine as or finer than the prototype pattern of the hierarchically subordinate level of the pattern hierarchy.

4. The image-processing method as recited in claim 1, wherein the feature image scene and each of the N feature image patterns are subdivided into M different feature images according to feature type; and the M feature images of the image scene are correlated with M feature images of the patterns having a respective identical feature, and the correlation values are subsequently added.

5. The image-processing method as recited in claim 4, wherein edges of an object are extracted as features from an image scene and the N patterns;

the edge image of the image scene and/or each of the edge images of the N patterns is or are subdivided into M edge images in corresponding intervals of edge orientations;

the feature values of the M edge images are locally softened;

the feature values of the corresponding edge image pattern are correlated with those of the transformed image scene for identical intervals; and the correlation values of the intervals are subsequently added.

6. The image-processing method as recited in claim 1, wherein patterns are only searched in an image cutout that is determined through the incorporation of global knowledge or assumptions about continuity of object motion, or information obtained via additional sensors or other pattern-processing methods.

7. The image-processing method as recited in claim 1 wherein objects in traffic are detected and recognized.

8. The image-processing method as recited in claim 7, wherein traffic infrastructure devices or road users are detected and recognized.

9. The image-processing method as recited in claim 1, wherein the detection results of the pattern-processing method are further processed in a regulating unit for controlling vehicle driving behavior and/or the flow of traffic.

10. The image-processing method as recited in claim 1, wherein the correlation values serve in the selection of an image cutout in which patterns for an object are detected;

features are extracted in the image cutout, and a feature vector is determined; and known classification methods are used to allocate the feature vector to a specific object class.

11. The image-processing method as recited in claim 1, wherein the object positions determined in image coordinates with the detection and recognition results are transformed into 2D or 3D global coordinates.

* * * * *